United States Patent [19]

Schexnayder

[11] B 4,006,939
[45] Feb. 8, 1977

[54] AIR PRESSURE MODULATED BRAKE VALVE SYSTEM

[75] Inventor: Lawrence Francis Schexnayder, Joliet, Ill.

[73] Assignee: Caterpillar Tractor Co., Peoria, Ill.

[22] Filed: Jan. 31, 1975

[21] Appl. No.: 545,856

[44] Published under the second Trial Voluntary Protest Program on March 30, 1976 as document No. B 545,856.

[52] U.S. Cl. .................................. 303/71; 188/170; 188/359; 303/13; 303/40; 303/68
[51] Int. Cl.² ........................................ B60T 13/22
[58] Field of Search .............. 303/6 C, 6 R, 6 M, 9, 303/13, 28, 40, 50, 54, 59, 63, 68, 71, 23 R; 188/170, 349, 358, 359, 264 F, 265; 137/627.5

[56] References Cited
UNITED STATES PATENTS

| | | |
|---|---|---|
| 3,259,216 | 7/1966 | Klaus et al. .................... 188/264 F |
| 3,423,136 | 1/1969 | Lohbauer ........................... 303/54 |
| 3,511,276 | 5/1970 | Jessen et al. .................... 303/9 UX |
| 3,547,234 | 12/1970 | Cummins et al. ................. 303/9 X |
| 3,586,138 | 6/1971 | Engle ................................. 188/265 |
| 3,606,485 | 9/1971 | Scott ................................. 303/23 R |
| 3,647,030 | 3/1972 | Burnett .......................... 188/170 X |
| 3,650,568 | 3/1972 | Poplawski ......................... 303/9 X |

*Primary Examiner*—Trygve M. Blix
*Assistant Examiner*—Douglas C. Butler
*Attorney, Agent, or Firm*—Phillips, Moore, Weissenberger, Lempio & Strabala

[57] ABSTRACT

A brake pressure modulating control valve for a hydraulically operated brake system. The control valve includes a spool associated with an air spring chamber. The system includes equipment for modulating the air pressure in the air chamber for constantly and concurrently modulating the pressure of the hydraulic fluid in the brake system.

9 Claims, 1 Drawing Figure

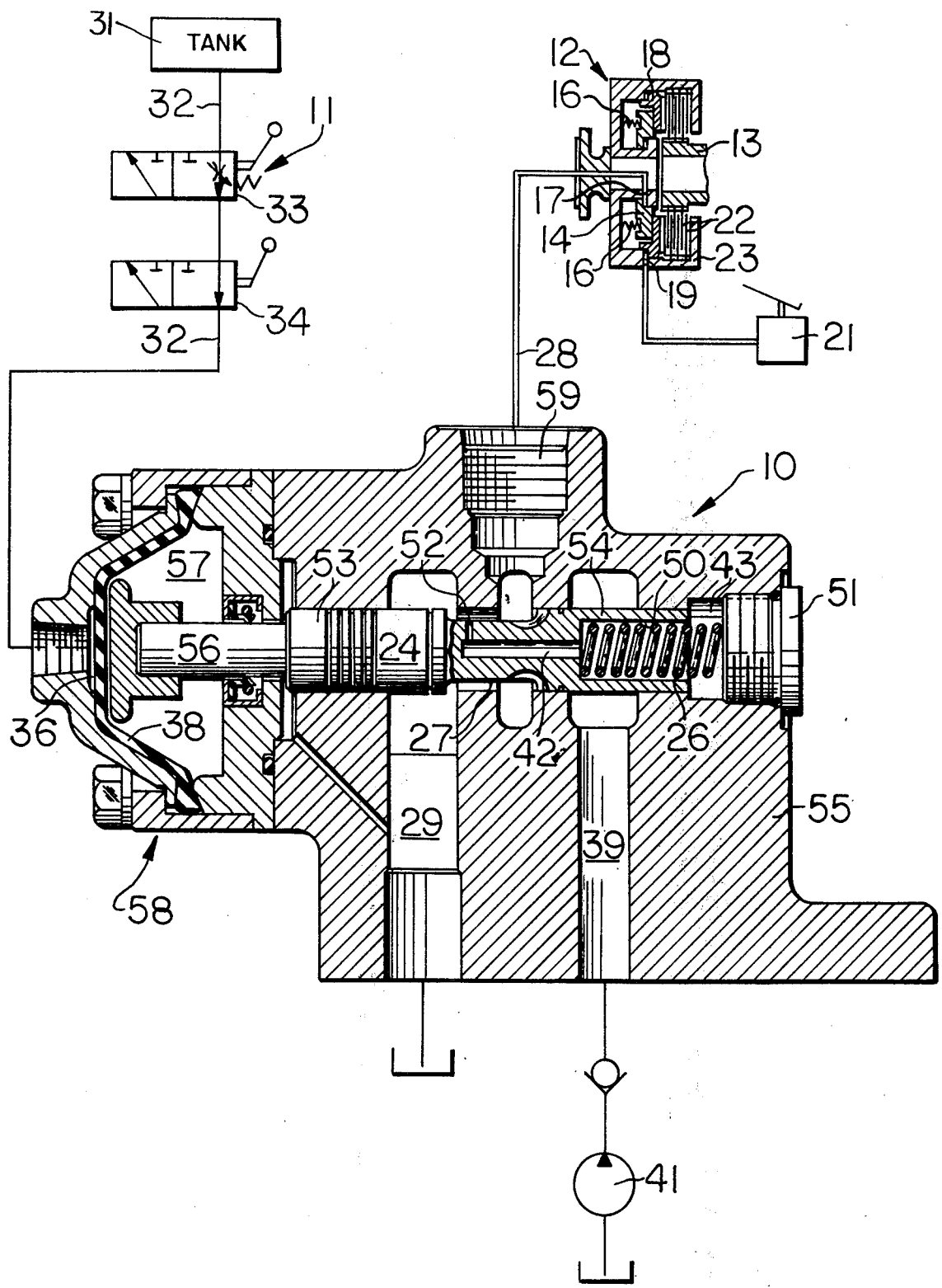

AIR PRESSURE MODULATED BRAKE VALVE SYSTEM

BACKGROUND OF THE INVENTION

The present invention relates to fluid brake systems. More particularly, the invention pertains to a control valve system including an air biased valve which constantly modulates the pressure of the fluid operating in a brake system which includes a spring applied-pressure released emergency brake mechanism.

Brake control systems for heavy duty earth moving equipment such as trucks sometimes include a pressure reducing valve for controlling the actuation of the service brakes. An example of such a prior art valve may be seen in U.S. Pat. No. 3,259,216 to Klaus et al, of common assignment herewith. Conventionally, the valve spools of such pressure reducing valves have been positioned mechanically by means of a spring disposed between the spool and a mechanical actuating rod or lever connected to an operator brake pedal.

To meet recently enhanced Federal safety regulations, many vehicle manufacturers have provided spring applied-hydraulically released emergency brakes to provide a fail-safe brake system which can be applied to stop a vehicle in the event of failure of the vehicle hydraulic system. It is the control of the application of such spring applied fluid released brake means as well as the control of fluid applied and released brake means to which the instant invention is directed.

Some prior art attempts to provide adequate brake control are taught in U.S. Pat. Nos. 3,650,568; 3,528,707; 3,547,234; and 3,423,136 to Poplawski, Casey, Cummins, and Lohbauer, respectively, all of common assignment herewith.

Summary and Objects of the Invention

This invention relates to a hydraulic brake supply system which includes a pressure regulating valve for constantly modulating the hydraulic pressure applied to the brakes of a vehicle for operation thereof. The pressure regulating valve includes an air chamber which is communicated with a regulatable supply of pressurized air and a resilient diaphragm which acts upon one end of a regulating spool to urge the spool in a first direction. The opposite end of the spool communicates by passage means with brake operating fluid. The air pressure and the fluid brake pressure thus tend to move the spool to and fro to maintain a pressure balance and to constantly regulate the flow of pressure fluid to the brake system.

The primary object of the present invention is to provide a fluid pressure regulating valve for a fluid operated braking system for a heavy duty vehicle.

Another object of the present invention is to provide a brake control valve having a spool, responsive to controlled air pressure, for controlling the pressure of brake system fluid.

A further object of the present invention is to provide such a brake control valve having an air chamber and resilient diaphragm directly responsive to the application of controlled air pressure.

Other particular objects and advantages of the invention will become apparent from the following description and drawing.

BRIEF DESCRIPTION OF THE DRAWING

The sole FIGURE is a partially schematic illustration of the major components of the present braking system with the pressure regulating valve shown in section.

DETAILED DESCRIPTION

Referring now to the drawing, the braking system of the present invention includes a braking mechanism shown generally at 12 for stopping the rotation of a shaft 13. The brake mechanism is equipped with an emergency system which includes an emergency brake piston 14 concentrically mounted within a service brake piston 18. Biasing means 16 in the form of compression springs urge the emergency brake piston 14 rightwardly to force the service brake piston against a plurality of discs and plates 22, some of which are spline connected to the shaft 13, to clamp such discs in place between the service brake piston and a wall portion of the housing 23 to stop rotation of the shaft 13.

During nomal operation of the system, the emergency brake piston 14 is held in its leftward "brake off" condition by pressurized fluid transmitted through a conduit 28 to a chamber 17. With chamber 17 pressurized, the service brake piston 18 can move leftwardly to permit unrestricted rotation of the shaft 13. The service brake piston 18 however can be selectively moved rightwardly to apply the brakes by means of the tranmission of a pressure medium such as hydraulic fluid into an actuating chamber 19. The transmission of such pressure fluid to the chamber 19 is controlled by means of an operator controlled brake valve and pedal system 21.

Control of fluid flow through the conduit 28 and the pressure of such fluid is accomplished by means of the instant pressure regulating valve, shown generally at 10. The pressure regulating valve means include a valve spool 24 resiliently urged leftwardly by a biasing means such as a spring 26. The spring is housed within a hollowed out bore portion 50 in chamber 42 and is held in place by means of a removable plug 51. The spool also includes an axial passageway 43 communicating with the bore portion 50 and with a restricted radial passage 52. The spool includes a reduced diameter portion 27 which resides between two land portions 53,54. The valve means 10 also includes a housing block 55 which contains threaded spaced-apart drilled passageways 29,39, the first of which communicates with a drain sump and the latter of which communicates with a source of fluid under pressure transmitted to the valve housing by pressure means such as a pump 41. The valve spool 24 is provided with a coaxial rod portion 56 which resides in a chamber 57 formed within a bolted-on housing means, shown generally at 58. A foot portion of the rod 56 engages a resilient diaphragm 38 adapted to flex within the chamber 57 and within an opposed air chamber 36. The chamber 36 communicates with a source of air under pressure by means of a conduit 32.

Control of air flow to the chamber 36 is accomplished by means of a valve and supply system shown generally at 11, which includes a pressurized tank 31 or other source of air under pressure, a manually operated emergency control valve 33, and a parking brake valve 34.

As will be apparent from the drawing, the admission of air under pressure to the chamber 36 tends to bias the spool 24 rightwardly against the biasing effect of the spring 26. With the valve spool 24 positioned as shown in the drawing, it can readily be appreciated that the conduit 28 and thus the emergency brake system chamber 17 are vented to drain via the passageway 29 such that the springs 16 cause the brake to be applied and the stoppage of the shaft 13. As the spool 24 moves rightwardly, however, it may be seen that the land 53 will progressively block communication between the drain passage 29 and the conduit 28 and that the land 54 will permit passage of fluid from the passage 39 to the conduit 28 for opposing the spring 16 and releasing the emergency brake mechanism.

During normal vehicle operations, pressurized air from the source 11 is transmitted through the conduit 32 to the air chamber 36. Pressurized air in the chamber 36 acts against the diaphragm 38 to move the spool 24 rightwardly to block communication between the conduit 28 and the drain passageway 29 while concurrently establishing communication between the fluid in that passage 39 and the conduit 28. This causes the emergency or parking brake to be disengaged during normal operations. By virtue, however, of the radial restricted passage 52 and the axial passage 42 in the spool 24, fluid pressure extant in the conduit 28 and in passageway 59 of the valve housing is constantly communicated to the chamber 43 wherein it acts upon the end portions of the spool 24 in opposition to the pressure in the air chamber 36 and in concert with the biasing force of the spring 26. When the force exerted by the fluid in the chamber 43 upon the spool 24 becomes greater than the force exerted upon the spool by the diaphragm 38, the spool will be moved leftwardly to a position whereby communication between the conduit 28 and the fluid inlet passage 39 is once again blocked. Also, with movement of the spool 24 leftwardly, the conduit 28 will be communicated with the drain passage 29.

It may thus be seen that the diaphragm 38 and the air in the pressure chamber 3 act as a modulating air spring for controlling the pressure of fluid transmitted to the chamber 17 via the passages 39,59 and the conduit 28. In the particular embodiment shown, the effective pressure area of the diaphragm within the chamber 36 is approximately five times that of the spool and surfaces exposed to the pressure within the chamber 43, such pressure being instantaneously somewhat less than the pressure in the passage 59 due to the restriction at 52 until a steady equalized pressure state is reached. Thus, the spool 24 is made to maintain a fluid pressure in the conduit 28 approximately five times greater than that of the air in the chamber 36.

By shifting the manual emergency valve 33 to a position in which it reduces the air flow through the line 32, the corresponding reduction of air pressure in the chamber 36 may be accomplished. This creates an imbalance of forces upon the valve spool 24 permitting it to move leftwardly to once again communicate the conduit 28 with the drain passageway 29. When fluid pressure in the conduit 28 reduces sufficiently so that the forces acting upon the spring end of the spool 24 are less than the forces exerted upon the spool by the diaphragm, the spool will again move rightwardly to block communication between the conduit and the drain passageway 29. Accordingly, by modulating the air pressure transmitted to the chamber 36 by means of the valve system 11 fluid pressure in the chamber 17 may be concurrently modulated to permit the gradual application of the brake mechanism 12.

While the brake system 12 includes a spring applied-pressure released mechanism, the valve 10 is obviously equally suitable for actuation of a fluid applied brake system wherein gradually increasing the air pressure in the chamber 36 will result in a gradual increase in the fluid pressure in the conduit 28.

While the invention has been described with particular reference to the preferred embodiment, it should be apparent that variations and modifications are possible within the purview of the inventive concepts. No limitations with respect to these variations and modifications are intended except those implicit in the scope of the appended claims.

I claim:

1. Modulating valve means for modulating the pressure of the operating fluid of a fluid pressure operated brake mechanism, said valve means including; a housing block, said housing block including first bore means and second, third, and fourth bore means in direct fluid communication with said first bore means, valve spool means at least partially disposed movably within said first bore means for selectively blocking and permitting fluid flow communication between said fourth bore means and said second bore means and between said fourth bore means and said third bore means, said spool means being a unitary member including a rod extension portion at one of two opposite ends thereof, said extension portion extending without said first bore means and without said housing block into a chamber housing means adjacent said housing block, said chamber housing means including first and second chambers separated by resilient diaphragm means, said resilient diaphragm means being in direct engagement with said extension portion of said unitary member, said chamber housing means including inlet passage means for communicating said first chamber with a regulatable source of secondary fluid under pressure, said modulating valve means performing the function of modulating the pressure of said operating fluid in response to the pressure of said secondary fluid in said first chamber, said modulating valve spool means unitary member having first and second opposite end portions, said first end portion being contiguous with said rod extension portion and said second end portion being disposed within a spring-pressure chamber at one end of said first bore means, said valve spool means unitary member including passageway means for constantly communicating said spring-pressure chamber with said fourth bore means, said spool means unitary member being urged in a first direction by the pressure extent in said spring-pressure chamber and being urged in a second opposite direction by said secondary fluid pressure extant in said first chamber.

2. The invention of claim 1 wherein said modulating valve means further include mechanical biasing means disposed within said spring-pressure chamber for urging said spool means in said first direction in concert with said pressure in said spring-pressure chamber.

3. The invention of claim 2 further including secondary fluid supply means, first conduit means for communicating said secondary fluid supply means with said first chamber, said secondary fluid supply means including manually actuatable valve means for controlling the flow and pressure of said secondary fluid supplied through said first conduit means to said first chamber.

4. The invention of claim 3 wherein said manually actuatable valve means include an emergency brake control valve and a parking brake control valve connected in series within said first conduit means.

5. The invention of claim 2 further including a source of pressurized brake operating fluid and means for communicating said operating fluid with said third bore means.

6. The invention of claim 5 further including a low pressure drain means for fluid communication with said second bore means.

7. The invention of claim 6 further including a fluid operated brake mechanism in fluid communication with said fourth bore means of second conduit means, said mechanism including first and second concentrically arranged actuating pistons and mechanical biasing means for urging said first piston in a brake-applied direction.

8. The invention of claim 7 wherein said mechanism further includes a plurality of discs and plates associated with a vehicular part to be braked and being selectively acted by said second piston.

9. The invention of claim 8 wherein said mechanism includes an emergency pressure chamber in constant fluid communication with said second conduit means, the communication of pressurized fluid to said emergency pressure chamber tending to urge said first piston in a direction opposite to said brake-applied direction.

* * * * *